(12) United States Patent
Flick

(10) Patent No.: US 7,378,945 B2
(45) Date of Patent: May 27, 2008

(54) VEHICLE SECURITY SYSTEM CONTROLLING VEHICLE BODY POSITION AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 366 days.

(21) Appl. No.: 10/855,016

(22) Filed: May 27, 2004

(65) Prior Publication Data

US 2005/0275509 A1 Dec. 15, 2005

(51) Int. Cl.
*B60R 25/10* (2006.01)

(52) U.S. Cl. .................. 340/426.1; 340/426.3; 340/463; 340/468; 340/426.33; 340/443; 340/426.2; 340/450

(58) Field of Classification Search ........... 340/426.1, 340/442, 426.13, 426.15, 426.16, 426.17, 340/426.18, 426.2, 443, 426.28, 426.29, 340/426.3, 463, 426.33, 468, 450
See application file for complete search history.

(56) References Cited

U.S. PATENT DOCUMENTS

| | | | | |
|---|---|---|---|---|
| 3,873,965 A | * | 3/1975 | Garcia | 340/447 |
| 4,610,462 A | | 9/1986 | Kumagai et al. | 280/707 |
| 4,666,135 A | | 5/1987 | Buma et al. | 267/64.21 |
| 4,803,630 A | * | 2/1989 | Takizawa et al. | 701/39 |
| 4,834,207 A | * | 5/1989 | Havenhill et al. | 180/287 |
| 4,887,064 A | * | 12/1989 | Drori et al. | 340/5.23 |
| 5,184,841 A | | 2/1993 | Pischke et al. | 280/707 |
| 5,529,372 A | * | 6/1996 | Cohen | 297/217.3 |
| 5,644,937 A | * | 7/1997 | Farino | 70/261 |
| 5,719,551 A | * | 2/1998 | Flick | 340/426.25 |
| 5,893,429 A | * | 4/1999 | Hackl et al. | 180/443 |
| 6,074,009 A | * | 6/2000 | Farino | 297/378.14 |
| 6,130,605 A | * | 10/2000 | Flick | 340/426.23 |
| 2004/0036309 A1 | * | 2/2004 | Farino | 296/65.13 |

OTHER PUBLICATIONS

"Praxis Adaptive Performance Suspension System", The Tire Track, 2004, available at www.tiretrack.com/suspension/praxis_components.jsp.

* cited by examiner

*Primary Examiner*—George A Bugg
*Assistant Examiner*—Daniel Previl
(74) *Attorney, Agent, or Firm*—Allen Dyer Doppelt Milbrath & Gilchrist

(57) ABSTRACT

A vehicle security system includes a vehicle security controller for operating at least one vehicle body position actuator to reposition the vehicle body responsive to at least one vehicle security sensor. The vehicle may include the vehicle wheels, the vehicle body, and at least one vehicle body position actuator connected therebetween. A respective vehicle body position actuator may be provided for each vehicle wheel, and the controller may operate the actuators in a predetermined pattern to reposition the vehicle body in a rocking motion. Rocking of the vehicle body is more readily noticed by persons adjacent the vehicle, and the rocking produces sweeping headlight beams that also more noticeable. If the thief were to enter the vehicle, the thief's actions would be impaired by the rocking of the vehicle.

39 Claims, 8 Drawing Sheets

VEHICLE SECURITY SYSTEM CONTROLLING VEHICLE BODY POSITION AND RELATED METHODS

FIELD OF THE INVENTION

The present invention relates to the field of security systems, and, more particularly, to security systems and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Earlier vehicle security systems needed to be directly connected by wires to individual vehicle devices, such as the vehicle horn or door switches of the vehicle. In other words, such vehicle security systems were hardwired to various vehicle components, typically by splicing into vehicle wiring harnesses or via interposing T-harnesses and connectors. A significant advance in the vehicle security industry is disclosed in U.S. Pat. No. 5,719,551 assigned to the assignee of the present invention. This patent discloses providing multi-vehicle compatibility between a vehicle security controller and a vehicle of a type including a vehicle data communications bus. Accordingly, the vehicle security or remote function controller is permitted to communicate with a vehicle device using a set of desired signals for a desired vehicle from a plurality of sets of signals for different vehicle.

As vehicle security systems have become more ubiquitous, alarm indications have become more common, especially in view of the number of false alarms. Indeed many passers-by have become immune to the sound and appearance of an activated vehicle security system. U.S. Pat. No. 6,130,605, also assigned to the assignee of the present invention, discloses an audible alarm indicator that generates an alarm as a plurality of distinguishable sound patterns. In other words, the alarm indication produced sounds as if multiple sirens are sounding. Accordingly, those in the vicinity are likely to believe that many vehicles are having their security systems breached.

Despite continuing developments in the area of vehicle security, there is still a general desirability to generate an alarm indication at the vehicle responsive to a vehicle security breach that is likely to attract the attention of those in the vicinity and encourage a would-be thief to immediately leave the vehicle.

SUMMARY OF THE INVENTION

In view of the foregoing background, it is therefore an object of the invention to provide a vehicle security system and related methods that produce a more effective vehicle security breach indication, for example.

This and other objects, features and advantages in accordance with the present invention are provided by a vehicle security system that includes a vehicle security controller for operating at least one vehicle body position actuator to reposition the vehicle body responsive to at least one vehicle security sensor. More particularly, the vehicle may include a plurality of vehicle wheels, the vehicle body, and at least one vehicle body position actuator connected therebetween. The vehicle may also include vehicle headlights carried by the body, and the vehicle security controller may also operate the vehicle headlights responsive to the vehicle security sensor. The at least one vehicle body position actuator may comprise a respective vehicle body position actuator for each vehicle wheel, and the vehicle security controller may operate the vehicle body position actuators in a predetermined pattern to reposition the vehicle body in a rocking motion. Accordingly, rocking of the vehicle body is more readily noticed by persons adjacent the vehicle, the rocking produces sweeping headlight beams that also more noticeable, and if the thief were to enter the vehicle, his actions would be impaired by the rocking of the vehicle.

In some embodiments, the vehicle security controller may be connected to at least one vehicle suspension controller that, in turn, is connected to the at least one vehicle body position actuator. For example, the at least one vehicle body position actuator may comprise at least one fluid-operated vehicle body position actuator having a fluid port, and the vehicle may further include a pressurized fluid source, and a valve arrangement selectively connecting the fluid port or ports to the pressurized fluid source or to atmosphere based upon the vehicle suspension controller. In other words, in these embodiments, the vehicle security controller may operate by commanding the vehicle suspension controller. In other embodiments, the vehicle security controller could directly control the pressurized fluid source and valve arrangement, for example.

A newer vehicle may further comprise a vehicle data communications bus extending through the vehicle body. For such a vehicle, the vehicle security controller may comprise a data bus interface for communicating via the vehicle data communications bus. To provide multi-vehicle compatibility, the vehicle security controller may further include a desired signal enabler for enabling operation using a desired set of data bus codes for the vehicle from among a plurality of sets of data bus codes for different vehicles. In some embodiments, the at least one vehicle security sensor may comprise a data bus interface for communicating with the vehicle security controller via the vehicle data communications bus. As noted above, the vehicle security controller may operate the body position actuator or actuators by commanding a vehicle suspension controller, and this may be achieved via the vehicle data communications bus.

The vehicle security system may further include at least one remote transmitter to be carried by a user when away from the vehicle, and a receiver connected to the vehicle security controller for causing the vehicle security controller to switch modes responsive to the at least one remote transmitter. For example, the vehicle security controller may be switchable among at least one of an armed mode to be responsive to the at least one vehicle security sensor, a disarmed mode, and a panic mode to reposition the vehicle body irrespective of the at least one vehicle security sensor.

The vehicle security system may also include an audible vehicle alarm indicator, and the vehicle security controller may also cause the audible alarm indicator to generate an audible alarm indication responsive to the at least one vehicle security sensor. For example, the at least one vehicle security sensor may comprise at least one of a door position switch, a hood position switch, a trunk position switch, and a motion sensor.

A method aspect of the invention is for providing vehicle security for a vehicle including a plurality of vehicle wheels, a vehicle body, and at least one vehicle body position actuator connected therebetween. The method may comprise sensing a vehicle security breach, and operating the at least one vehicle body position actuator responsive to sensing the vehicle security breach. The vehicle may also include vehicle headlights carried by the body, and the method may further include operating the vehicle headlights responsive to sensing the vehicle security breach. The vehicle body position actuators may be operated in a predetermined pattern to reposition the vehicle body in a rocking motion.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
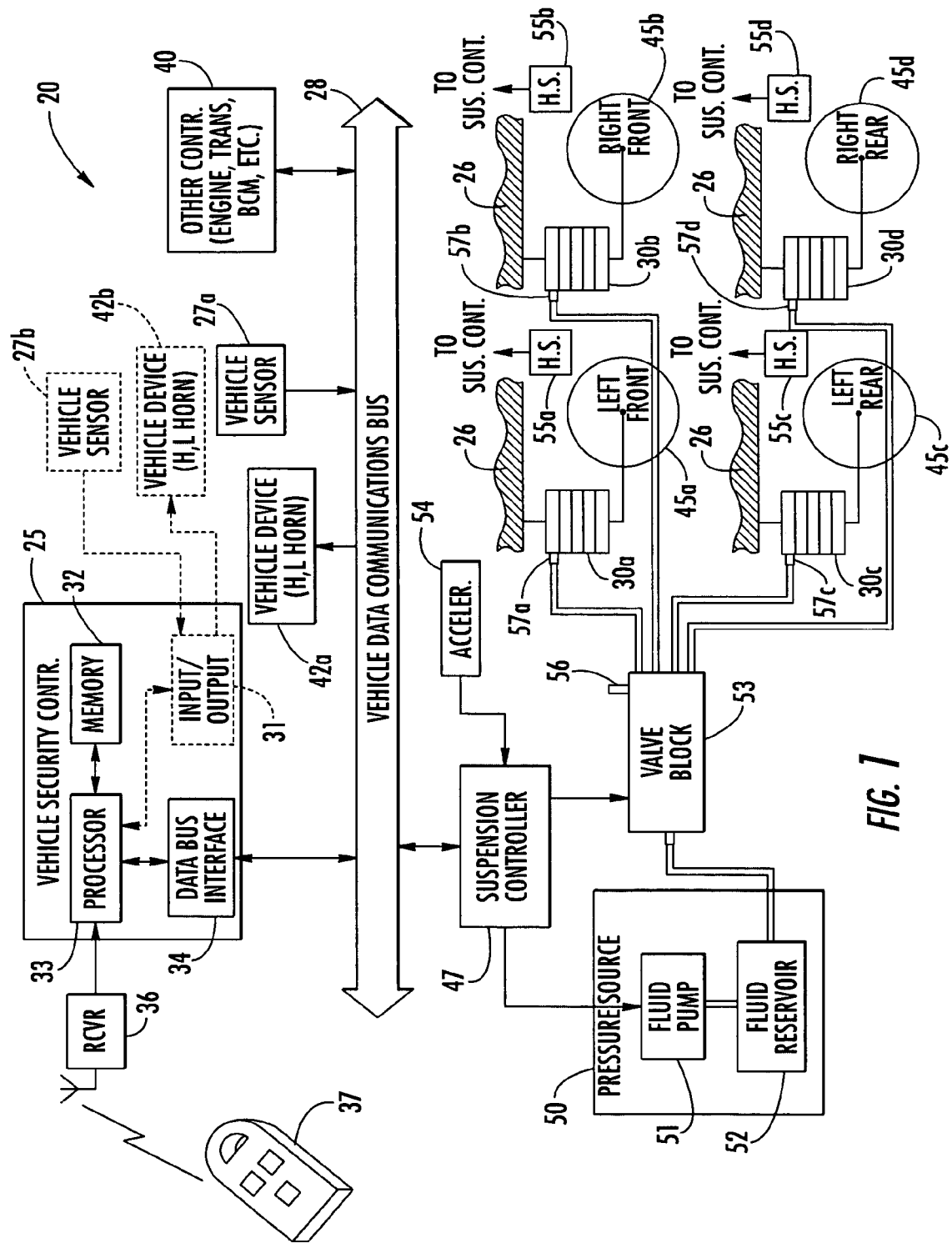
FIG. 1 is schematic block diagram of a vehicle security system in accordance with a first embodiment of the invention.

Referring initially to FIG. 1, a first embodiment of a vehicle security system 20 is now described. The security system 20 includes a vehicle security controller 25 for operating the vehicle body position actuators 30a-30d to reposition the vehicle body 26 responsive to at least one vehicle security sensor 27a, 27b. As shown in the illustrated embodiment, the at least one vehicle security sensor 27a may be of a type that is connected to the vehicle data communications bus 28 that extends throughout the vehicle as will be appreciated by those of skill in the art. Alternately or additionally, the at least one vehicle security sensor 27b may be of a type that is hardwired to the optional input/output interface 31 of the vehicle security controller 25.

The vehicle security controller 25 also illustratively includes a processor 33 that may operate under stored program control as will be appreciated by those skilled in the art. The processor 33 may be connected to an external memory 32 as shown in the illustrated embodiment, and/or may have embedded memory in other embodiments. The vehicle security controller 25 also includes a data bus interface 34 for permitting the processor 33 to communicate bidirectionally over the vehicle data communications bus 28.

The processor 33 is also connected to a receiver 36 that can receive signals from a wireless remote transmitter 37. The receiver 36 may be included within a common housing for the security controller 25 or may be a remote receiver to be positioned in the front windshield area, for example, to provide greater range of operation. The remote transmitter 37 is typically of the type that is carried by a user when away from the vehicle, and that can be used to switch between armed, disarmed or panic modes, for example.

In the armed mode, the vehicle security controller 25 will be responsive the vehicle security sensors 27a, 27b to trigger an alarm indication upon a breach of security as will be appreciated by those skilled in the art. For example, the vehicle security sensor or sensors 27a, 27b may comprise at least one of a door position switch, a hood position switch, a trunk position switch, and a motion sensor. In the disarmed mode, the user may operate the vehicle without the alarm indication being triggered. In the panic mode the alarm indication is triggered irrespective of any security sensors as will also be appreciated by those skilled in the art.

The vehicle data communications bus 28 may also connected to other devices within the vehicle, such as the other controller or controllers 40. The other controller 40 may be the engine management controller, may be a transmission controller, or may be the body control module, for example. Those of skill in the art will appreciate that other devices and controllers may be connected to the vehicle data communications bus 28.

The vehicle security system also includes one or more vehicle devices 42a, 42b that may be used to indicate an alarm, such as the vehicle headlights or vehicle horn, for example. Similar to the vehicle security sensors 27a, 27b discussed above, the vehicle devices 42a may be of a type that are operable over the vehicle data communications bus 28. Alternately or additionally, the vehicle devices 42b may be hardwire connected to the input/output interface 31 of the vehicle security controller 25. In other words, the vehicle security system 20 may also include a vehicle device 42a, 42b, such as an audible vehicle alarm indicator, and the vehicle security controller may also cause the audible alarm indicator to generate an audible alarm indication responsive to the vehicle security sensor 27a, 27b.

The shortcomings of the prior art alarm indications have been addressed above. In particular, the huge popularity of vehicle security systems, and their tendency toward false alarms, has rendered much of the general public immune to the sounds of a triggered alarm. The vehicle security system 20 addresses that shortcoming by providing a more visible and discernible alarm indication that will be difficult for passers-by or those in the vicinity to ignore, and that will also make a would-be thief less comfortable in an attempt to steal a vehicle or the contents therefrom.

The vehicle includes a plurality of vehicle wheels 45a-45d, the vehicle body 26, and at least one vehicle body position actuator connected therebetween. In the illustrated embodiment, a respective vehicle body position actuator 30a-30d is provided at each of the four wheels 45a-45d. The actuators 30a-30d may be air-springs or air bags generally available for suspension leveling and/or ride control as will be appreciated by those skilled in the art.

As shown, such a suspension system may also include a suspension controller 47 connected to control a pressure source 50 and a valve block 53. The valve block 53 may include a housing that contains a series of solenoid controlled valves (not shown) that can maintain the pressure in the respective actuator, increase the pressure in the actuator by coupling the respective fluid port 57a-57d of the desired actuator 30a-30d to the pressure source 50, or vent all or part of the pressure from the actuator to atmosphere via the exhaust port 56. The pressure source illustratively includes a fluid pump 51 such as an air compressor, and a pressurized fluid reservoir 52 connected to the pump. The suspension controller 47 may receive as inputs, signals from an accelerometer 54, as well as individual height signals from the height sensors 55a-55d associated with the respective wheels 45a-45d.

As will also be appreciated by those skilled in the art, the suspension controller 47 may also receive command or other signals via the vehicle data communications bus 28, such as to adjust ride comfort, etc. U.S. Pat. Nos. 4,610,462; 4,666, 135; 4,803,630; and 5,184,841 also disclose suspension systems and/or components thereof as may be used in the vehicle security system 20, and the entire disclosure of each patent is incorporated by reference herein. Aftermarket air suspension kits are also available from a number of manufacturers, such as Praxis Advanced Suspensions available from the Tire Rack of South Bend, Ind.

In yet other embodiments, the vehicle body position actuators 30a-30d may operate based upon hydraulic fluid or may be electromechanical actuators as will be appreciated by those skilled in the art. Of course, not all wheels 45a-45d need to be equipped with individual actuators 30a-30d. Only the rear wheels 45c, 45d may have respective actuators 30c, 30d in some embodiments. In yet other embodiments, only a single vehicle body position actuator may be used.

To provide the advantages described herein, the vehicle security controller 25 may operate the vehicle body position actuators 30a030d in a predetermined pattern to reposition the vehicle body in a rocking motion. For example, the body 26 adjacent the front wheels 30a, 30b can be alternately raised and lowered, while the body adjacent the back wheels 30c, 30d can be alternately lowered and raised. The left and right sides of the vehicle body 26 could be similarly alternately raised and lowered to thereby create a rocking motion. Of course diagonal and rotating patterns of raising and lowering are also possible, as is operation of the actuators together in pairs or altogether. Rocking of the vehicle body 26 may be more readily noticed by persons adjacent the vehicle, as the rocking produces sweeping headlight beams that also more noticeable, and if the thief were to enter the vehicle, his actions would be impaired by the rocking of the vehicle.

In the illustrated embodiment of FIG. 1, the vehicle security system 20 is for a vehicle including a vehicle data communications bus 28. In addition, the vehicle also includes the illustrated suspension controller 47 which can receive control commands via the data communications bus 28. In this illustrated embodiment, as may typical for newer model vehicles, the alarm indication may be generated by having the vehicle security controller 25 generate command codes onto the data communications bus 28 that, in turn, command the vehicle suspension controller 47 to perform the desired motions of the vehicle body 26 as described herein.

Figure 2:
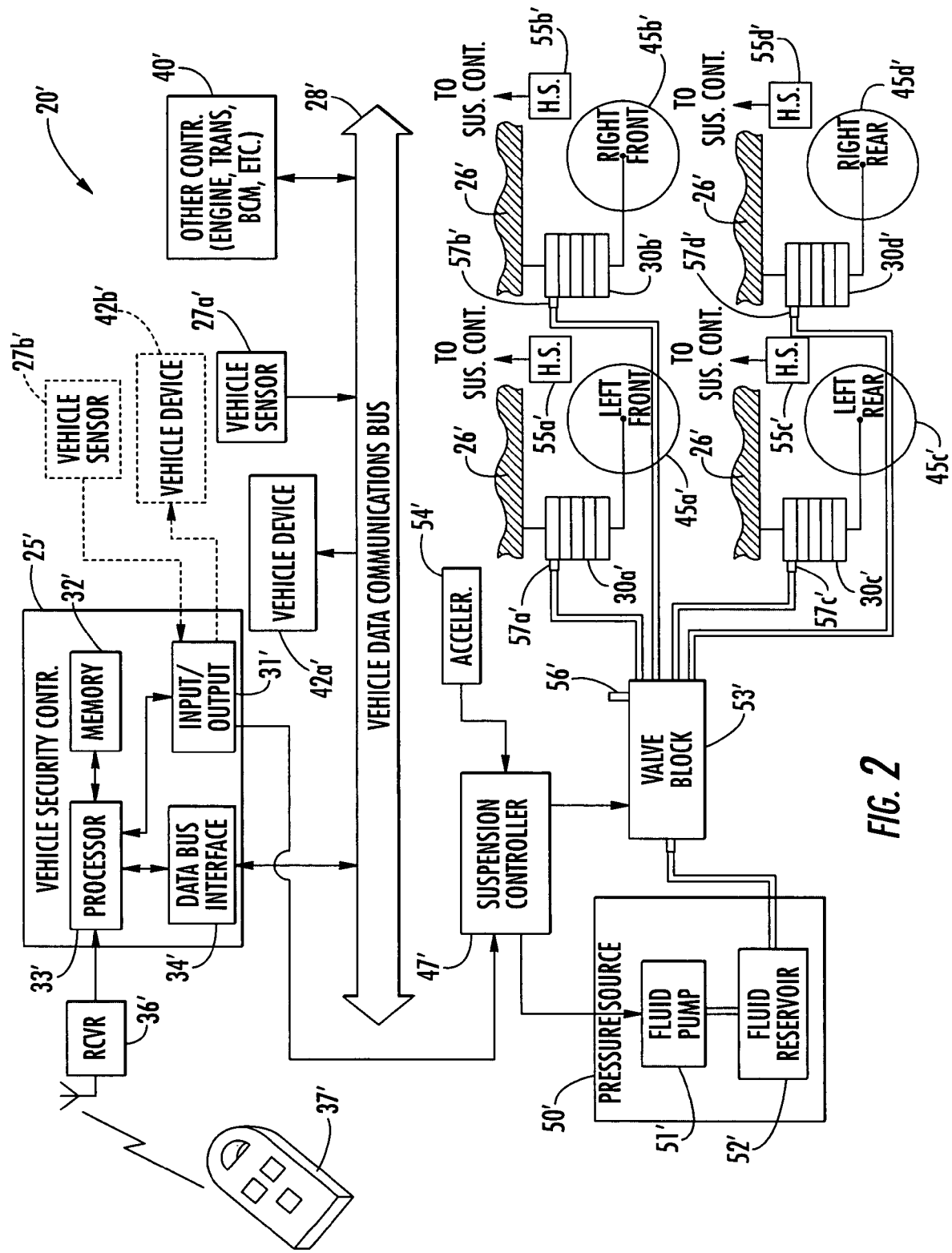
FIG. 2 is schematic block diagram of a vehicle security system in accordance with a second embodiment of the invention.

Turning now to FIG. 2, a second embodiment of the vehicle security system 20' is now described. Of interest in this embodiment, although the vehicle security controller 25 includes the data bus interface 34', it is hardwire connected via the input/output interface 31' to the vehicle suspension controller 47'. In this embodiment, the vehicle security controller 45' sends signals to the suspension controller 47' to cause movement of the vehicle body 26' as described above. Those other elements of this embodiment of the security system 20' not specifically discussed are indicated with prime notation, are similar to those discussed above with reference to FIG. 1, and need no further discussion herein.

Figure 3:
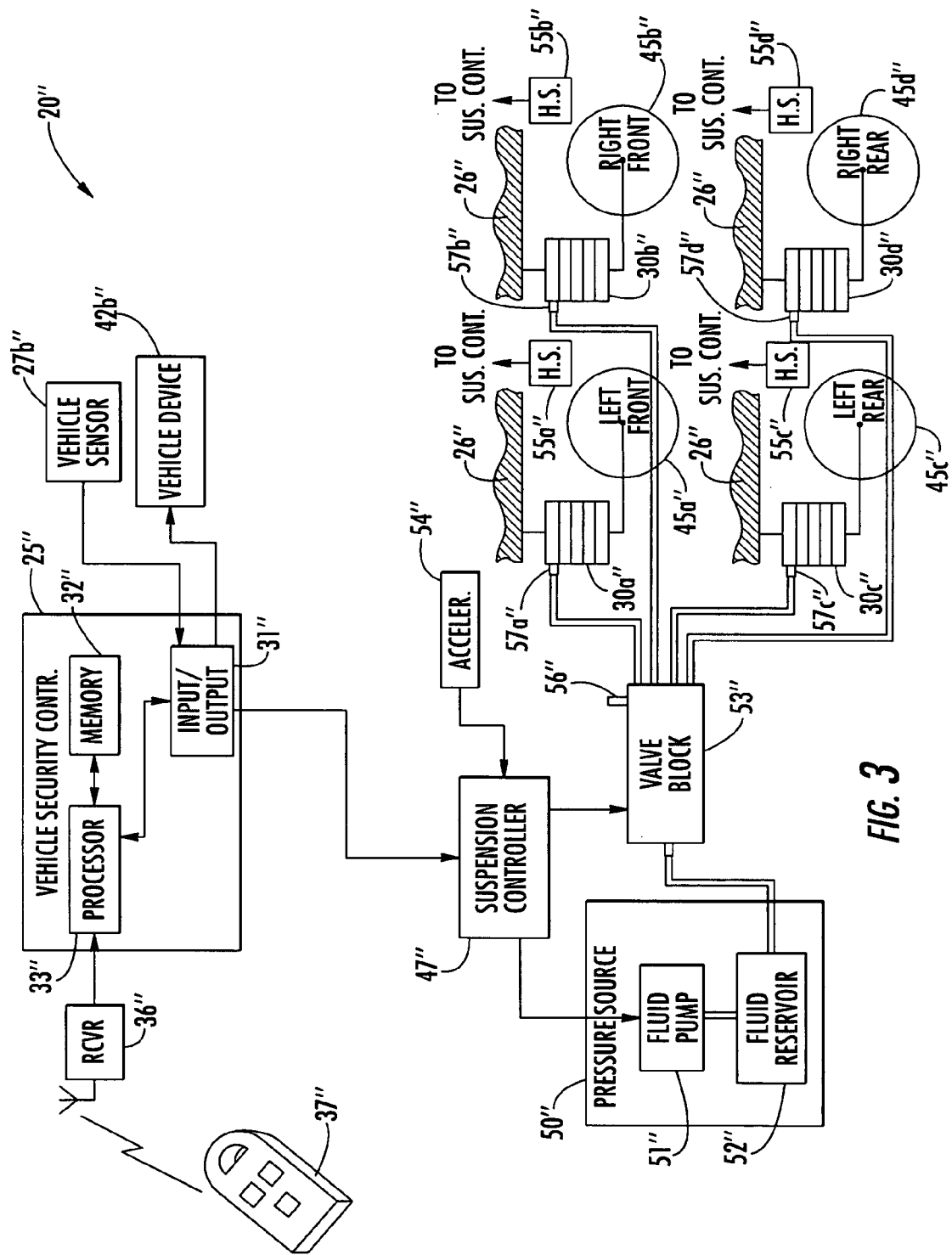
FIG. 3 is schematic block diagram of a vehicle security system in accordance with a third embodiment of the invention.

Turning now additionally to FIG. 3, a third embodiment of a vehicle security system 20" is now described. In this embodiment, the vehicle security controller 25" does not include a data bus interface and does not connect to a vehicle data communications bus. The vehicle may or may not have a vehicle data communications bus. In this embodiment, the input/output interface 31" is hardwire connected to the suspension controller 47" for selectively causing changes in the position of the vehicle body 26" as described above. Those other elements of this embodiment of the security system 20" not specifically discussed are indicated with double prime notation, are similar to those discussed above with reference to FIGS. 1 and 2, and need no further discussion herein.

Figure 4:
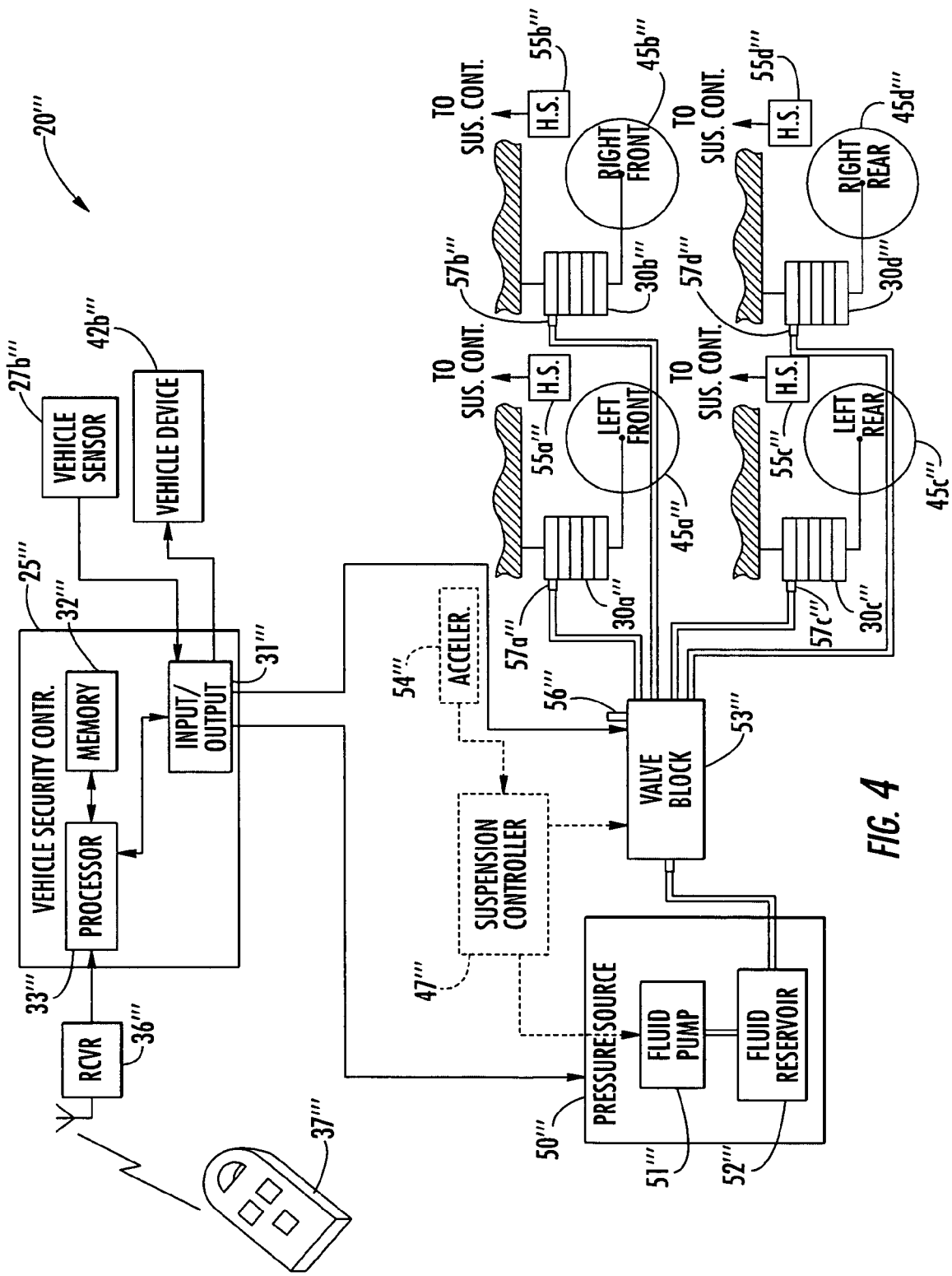
FIG. 4 is schematic block diagram of a vehicle security system in accordance with a fourth embodiment of the invention.

Referring now additionally to FIG. 4, a fourth embodiment of the vehicle security system 20''' is now described. In this embodiment, the input/output interface 31''' of the vehicle security controller 25''' is hardwire connected to the pressure source 50''' and the valve block 53''' to thereby cause the movements of the vehicle body 26''' as discussed above. The suspension controller 47''' and its accelerometer 54''' are optional and not needed in all embodiments as will be appreciated by those skilled in the art. Those other elements of this embodiment of the security system 20''' not specifically discussed are indicated with triple prime notation, are similar to those discussed above with reference to FIGS. 1-3, and need no further discussion herein.

Referring now additionally to FIGS. 5-8, another advantageous optional feature of the vehicle security system 20-20''' is now described. To provide multi-vehicle compatibility, the vehicle security controller 25-25''' may further include a desired signal enabler for enabling operation using a desired set of data bus codes for the vehicle from among a plurality of sets of data bus codes for different vehicles. The desired signal enabler is for enabling the vehicle security controller to operate using a desired set of signals for a desired vehicle from among a plurality of possible sets of signals for different vehicles. As would be readily understood by those skilled in the art, the term different vehicles may include vehicles from different manufacturers, different models, or even different trim levels of the same make and model. Accordingly, the desired signal enabler permits the vehicle security controller to communicate with the vehicle security sensors, vehicle security devices, and/or suspension controller via the vehicle data communications bus.

Figure 5:
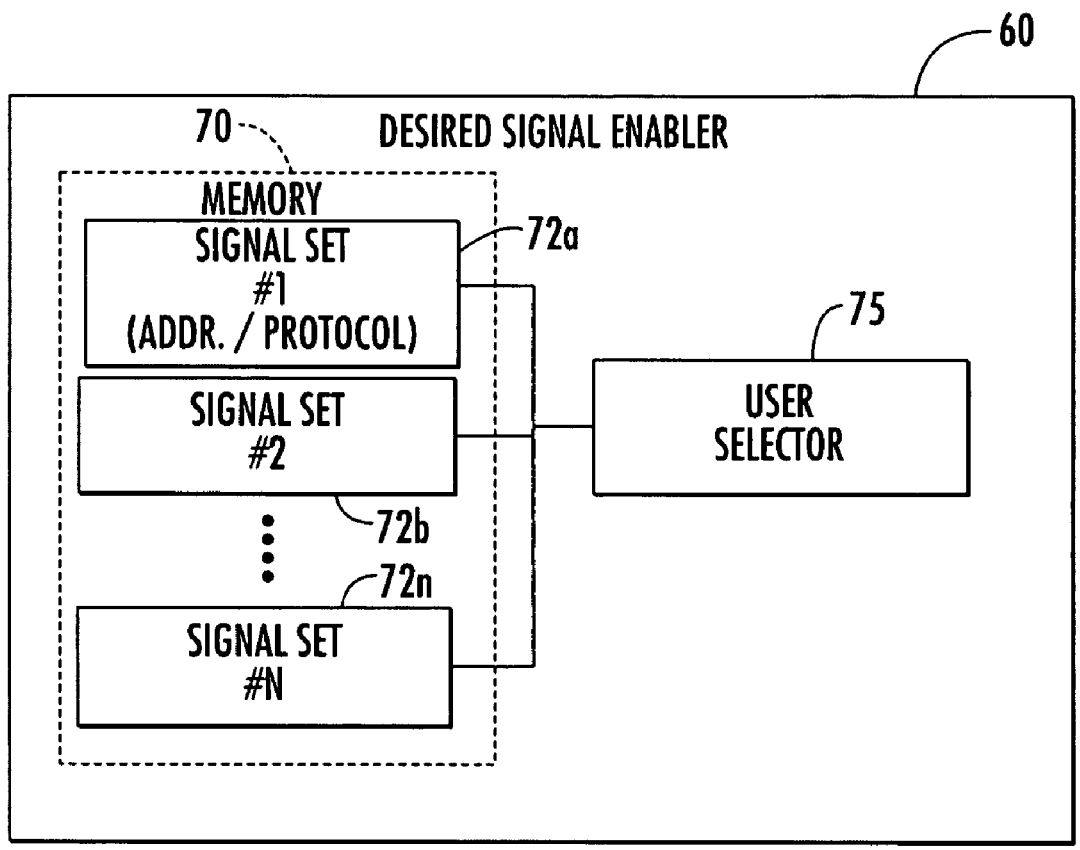
FIG. 5 is a schematic block diagram of a first embodiment of desired signal enabler as may be implemented in any of the vehicle security system embodiments shown in FIGS. 1-4.

The illustrated embodiment of the desired signal enabler 60 shown in FIG. 5 includes a memory 70 for storing a plurality of sets 72a, 72b and 72n of signals for different vehicles, and a user selector 75 for permitting a user to select the desired set of signals from the plurality of different sets of signals for different vehicles. By storing sets of signals is meant storing information or data necessary to generate the desired signals on the data bus as would be readily understood by those skilled in the art. The memory 70 may store a plurality of different sets of signals representative of different device addresses for different vehicles. Alternatively, or in addition thereto, the memory 70 may store a plurality of different protocols for different vehicles. A keypad or other input device may be used as the user selector 75 to permit the user to select the desired signal set for his vehicle. A valet switch (not shown), for example, may also serve as the user selector 75 and be operated by the user to select the desired signal set. The user may select the desired set of signals by entering a unique digital code similar to the selection of signals for a home electronics universal remote control. Other techniques for permitting the user to select the desired signal set from a plurality of stored sets are also contemplated by the invention as would be readily appreciated by those skilled in the art.

Figure 6:
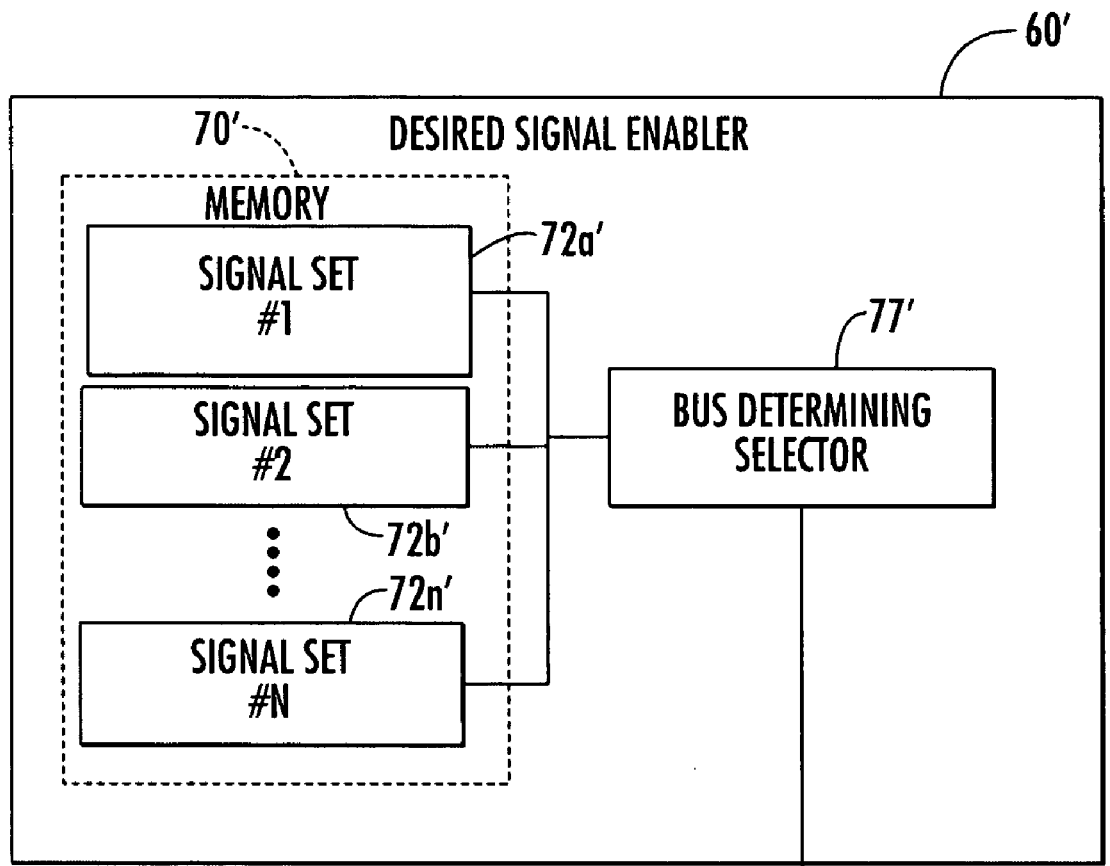
FIG. 6 is a schematic block diagram of a second embodiment of desired signal enabler as may be implemented in any of the vehicle security system embodiments shown in FIGS. 1-4.

As shown in FIG. 6 another embodiment of the desired signal enabler 60' is now described. In this embodiment, a bus determining selector 77' is used for determining the desired set of signals based upon signals on the data communications bus 62'. For example, the bus determining selector 77' could determine the desired set of signals based upon sensed voltage levels or based upon the timing of signal pulses on the data communications bus 62'. The other components of this embodiment of the desired signal enabler 60' are similar to those described above with reference to FIG. 5 and need no further description herein.

Figure 7:
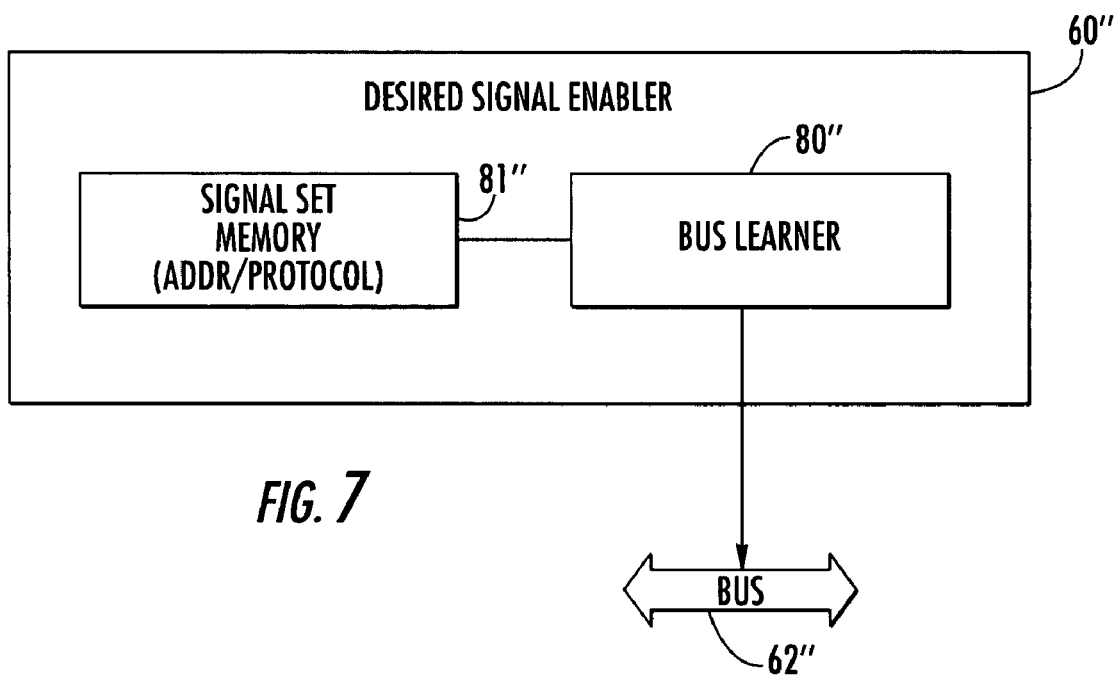
FIG. 7 is a schematic block diagram of a third embodiment of desired signal enabler as may be implemented in any of the vehicle security system embodiments shown in FIGS. 1-4.

Yet another embodiment of the desired signal enabler 60" is explained with additional reference to FIG. 7. In this illustrated embodiment, the desired signal enabler 60" includes a desired signal set memory 81" operatively connected to the illustrated bus learner 80". The bus learner 80" may determine and store in the signal set memory 81" the protocol and/or device addresses for the vehicle devices. For example, the bus learner 80" may permit the user to operate various vehicle devices and store a desired signal set based thereon as would be readily understood by those skilled in the art. The other components of the desired signal enabler 60" are similar to those described above with reference to FIGS. 5 and 6 and need no further description herein.

Figure 8:
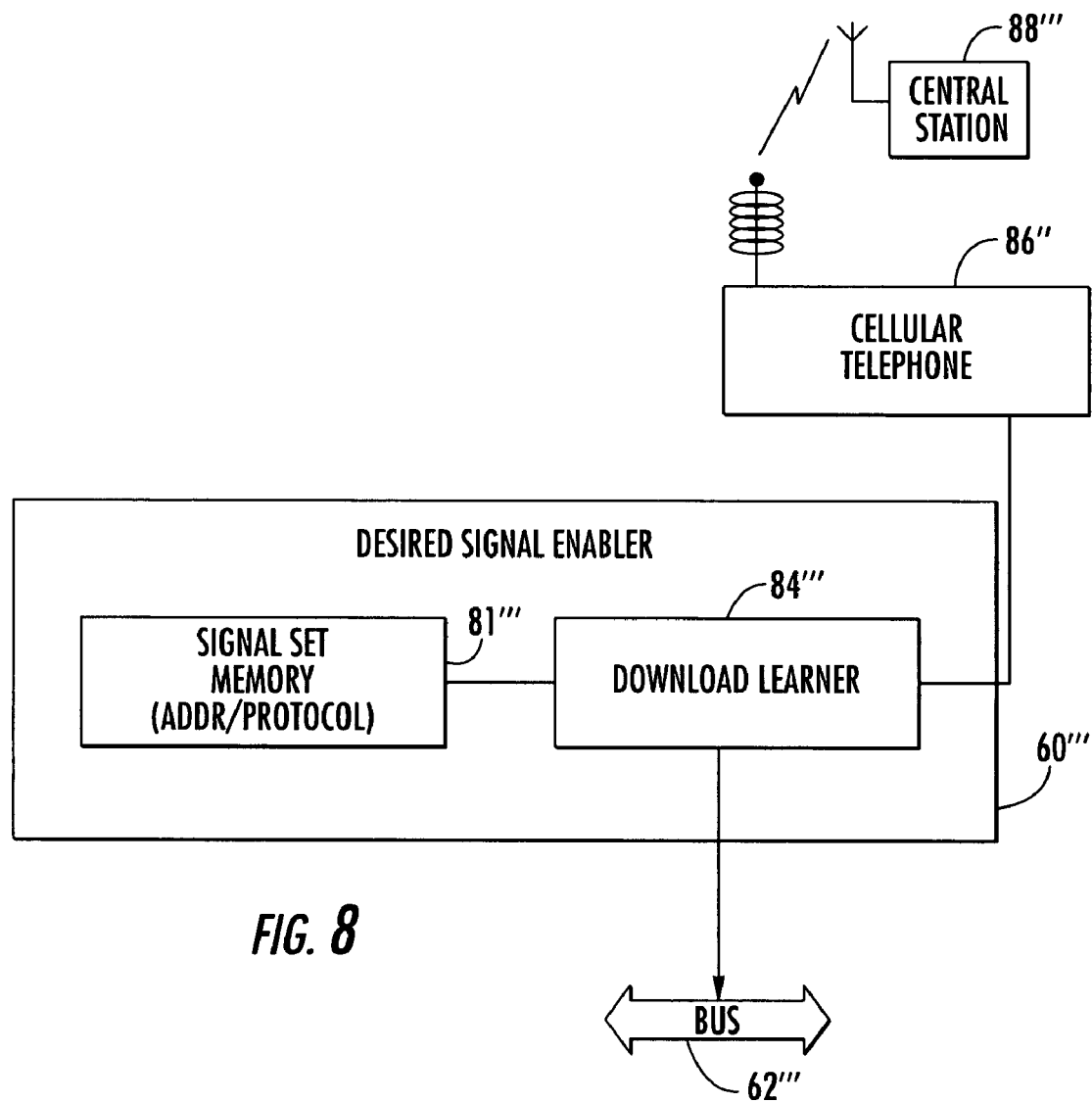
FIG. 8 is a schematic block diagram of a fourth embodiment of desired signal enabler as may be implemented in any of the vehicle security system embodiments shown in FIGS. 1-4.

Still another exemplary embodiment of a desired signal enabler 60''' is now explained with additional reference to FIG. 8. The desired signal enabler 60''' illustratively includes a signal set memory 81''' operatively connected to the schematically illustrated download learner 84'''. The download learner 84''' may include an interface connected to the illustrated vehicle cellular telephone 86''' to permit learning or downloading of the desired signal set from a remote or central monitoring and control station 88''', for example. The download learner 84''' could also be temporarily connected to a device, such as a laptop computer, for example, to have downloaded therefrom the desired codes. As would be readily understood by those skilled in the art, the download learner 84''' as well as the functional modules of other desired signal enablers 60, 60', and 60" may be implemented by software in the processor of the vehicle security controller or in a separate microprocessor or circuits. Other features relating to desired signal enabling are disclosed in U.S. Pat. No. 5,719,551, the entire contents of which are incorporated herein by reference.

Referring again to FIG. 1, a method aspect of the invention is for providing vehicle security for a vehicle including a plurality of vehicle wheels 45a-45d, a vehicle body 26, and at least one vehicle body position actuator 30a-30d connected therebetween. The method may comprise sensing a vehicle security breach, and operating the at least one vehicle body position actuator 30a-30d responsive to sensing the vehicle security breach. The vehicle may also include vehicle headlights 42a, 42b carried by the body 26, and the method may further include operating the vehicle headlights responsive to sensing the vehicle security breach. The vehicle body position actuators 30a-30d may be operated in a predetermined pattern to reposition the vehicle body in a rocking motion.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A vehicle security system for a vehicle including a plurality of vehicle wheels, a vehicle body having an initial position relative to the vehicle wheels, and at least one vehicle body position actuator connected between the vehicle wheels and the vehicle body, the vehicle security system comprising:

at least one vehicle security sensor; and a vehicle security controller for operating the at least one vehicle body position actuator to reposition the vehicle body relative to the vehicle wheels and responsive to said at least one vehicle security sensor sensing a vehicle security breach.

2. The vehicle security system according to claim 1 wherein the vehicle also includes vehicle headlights carried by the body; and wherein said vehicle security controller also operates the vehicle headlights responsive to said at least one vehicle security sensor.

3. The vehicle security system according to claim 1 wherein the at least one vehicle body position actuator comprises a respective vehicle body position actuator for each vehicle wheel; and wherein said vehicle security controller operates the vehicle body position actuators in a predetermined pattern responsive to said at least one vehicle security sensor to reposition the vehicle body relative to the vehicle wheels in a rocking motion.

4. The vehicle security system according to claim 1 wherein the vehicle further comprises at least one vehicle suspension controller connected to the at least one vehicle body position actuator; and wherein said vehicle security controller is connected to the at least one vehicle suspension controller.

5. The vehicle security system according to claim 4 wherein the at least one vehicle body position actuator comprises at least one fluid-operated vehicle body position actuator having a fluid port; and wherein the vehicle further comprises a pressurized fluid source, and a valve arrangement selectively connecting the fluid port of the at least one fluid-operated vehicle body position actuator to the pressurized fluid source or to atmosphere based upon the at least one vehicle suspension controller.

6. The vehicle security system according to claim 1 wherein the vehicle further comprises a vehicle data communications bus extending through the vehicle body; and wherein said vehicle security controller comprises a data bus interface for communicating via the vehicle data communications bus.

7. The vehicle security system according to claim 6 wherein said vehicle security controller further comprises a desired signal enabler for enabling operation using a desired set of data bus codes for the vehicle from among a plurality of sets of data bus codes for different vehicles.

8. The vehicle security system according to claim 6 wherein said at least one vehicle security sensor comprises a data bus interface for communicating with said vehicle security controller via the vehicle data communications bus.

9. The vehicle security system according to claim 6 wherein the vehicle further comprises at least one vehicle suspension controller connected between the at least one vehicle body position actuator and the vehicle data communications bus; and wherein said vehicle security controller communicates with the at least one vehicle suspension controller via the vehicle data communications bus.

10. The vehicle security system according to claim 9 wherein the at least one vehicle body position actuator comprises at least one fluid-operated vehicle body position actuator having a fluid port; and wherein the vehicle further comprises a pressurized fluid source, and a valve arrangement selectively connecting the fluid port of the at least one fluid-operated vehicle body position actuator to the pressurized fluid source or to atmosphere based upon the at least one vehicle suspension controller.

11. The vehicle security system according to claim 1 further comprising:
at least one remote transmitter to be carried by a user when away from the vehicle; and
a receiver connected to said vehicle security controller for causing said vehicle security controller to switch modes responsive to said at least one remote transmitter.

12. The vehicle security system according to claim 1 wherein said vehicle security controller is switchable among at least one of an armed mode to be responsive to said at least one vehicle security sensor, a disarmed mode, and a panic mode to reposition the vehicle body irrespective of said at least one vehicle security sensor.

13. The vehicle security system according to claim 1 further comprising an audible vehicle alarm indicator; and wherein said vehicle security controller also causes said audible alarm indicator to generate an audible alarm indication responsive to said at least one vehicle security sensor.

14. The vehicle security system according to claim 1 wherein said at least one vehicle security sensor comprises at least one of a door position switch, a hood position switch, a trunk position switch, and a motion sensor.

15. A vehicle security system for a vehicle including a plurality of vehicle wheels, a vehicle body having an initial position relative to the vehicle wheels, and at least one vehicle body position actuator connected between the vehicle wheels and the vehicle body, the vehicle security system comprising:
at least one remote transmitter to be carried by a user when away from the vehicle;
a vehicle security controller for operating the at least one vehicle body position actuator to reposition the vehicle body relative to the vehicle wheels; and
a receiver connected to said vehicle security controller for causing said vehicle security controller to switch modes responsive to said at least one remote transmitter.

16. The vehicle security system according to claim 15 wherein said vehicle security controller is switchable among at least one of an armed mode, a disarmed mode, and a panic mode.

17. The vehicle security system according to claim 15 wherein the vehicle also includes vehicle headlights carried by the body; and wherein said vehicle security controller also operates the vehicle headlights.

18. The vehicle security system according to claim 15 wherein the at least one vehicle body position actuator comprises a respective vehicle body position actuator for each vehicle wheel; and wherein said vehicle security controller operates the vehicle body position actuators in a predetermined pattern to reposition the vehicle body relative to the vehicle wheels in a rocking motion.

19. The vehicle security system according to claim 15 wherein the vehicle further comprises at least one vehicle suspension controller connected to the at least one vehicle body position actuator; and wherein said vehicle security controller is connected to the at least one vehicle suspension controller.

20. The vehicle security system according to claim 15 wherein the vehicle further comprises a vehicle data communications bus extending through the vehicle body; and wherein said vehicle security controller comprises a data bus interface for communicating via the vehicle data communications bus.

21. The vehicle security system according to claim 20 wherein said vehicle security controller further comprises a desired signal enabler for enabling operation using a desired set of data bus codes for the vehicle from among a plurality of sets of data bus codes for different vehicles.

22. The vehicle security system according to claim 20 wherein said at least one vehicle security sensor comprises a data bus interface for communicating with said vehicle security controller via the vehicle data communications bus.

23. The vehicle security system according to claim 20 wherein the vehicle further comprises at least one vehicle suspension controller connected between the at least one vehicle body position actuator and the vehicle data communications bus; and wherein said vehicle security controller communicates with the at least one vehicle suspension controller via the vehicle data communications bus.

24. The vehicle security system according to claim 15 further comprising a desired signal enabler for enabling said vehicle security controller to operate using a desired set of data bus codes for the vehicle from among a plurality of sets of data bus codes for different vehicles.

25. The vehicle security system according to claim 15 further comprising an audible vehicle alarm indicator connected to said vehicle security controller.

26. A vehicle security system for a vehicle including a plurality of vehicle wheels, a vehicle body having an initial position relative to the vehicle wheels and including a vehicle data communications bus extending throughout the vehicle body, and at least one vehicle body position actuator controllable by signals on the vehicle data communications bus and being connected between the vehicle wheels and vehicle body, the vehicle security system comprising:
- a vehicle security controller for operating the at least one vehicle body position actuator to reposition the vehicle body relative to the vehicle wheels;
- said vehicle security controller comprising a data bus interface for communicating via the vehicle data communications bus.

27. The vehicle security system according to claim 26 wherein said vehicle security controller further comprises a desired signal enabler for enabling operation using a desired set of data bus codes for the vehicle from among a plurality of sets of data bus codes for different vehicles.

28. The vehicle security system according to claim 26 wherein the vehicle further comprises at least one vehicle suspension controller connected between the at least one vehicle body position actuator and the vehicle data communications bus; and wherein said vehicle security controller communicates with the at least one vehicle suspension controller via the vehicle data communications bus.

29. The vehicle security system according to claim 26 wherein the vehicle also includes vehicle headlights carried by the body; and wherein said vehicle security controller also operates the vehicle headlights.

30. The vehicle security system according to claim 26 wherein the at least one vehicle body position actuator comprises a respective vehicle body position actuator for each vehicle wheel; and wherein said vehicle security controller operates the vehicle body position actuators in a predetermined pattern responsive to said at least one vehicle security sensor to reposition the vehicle body relative to the vehicle wheels in a rocking motion.

31. The vehicle security system according to claim 26 further comprising:
- at least one remote transmitter to be carried by a user when away from the vehicle; and
- a receiver connected to said vehicle security controller for causing said vehicle security controller to switch modes responsive to said at least one remote transmitter.

32. The vehicle security system according to claim 26 further comprising an audible vehicle alarm indicator; and wherein said vehicle security controller also causes said audible alarm indicator to generate an audible alarm indication.

33. A method for providing vehicle security for a vehicle including a plurality of vehicle wheels, a vehicle body having an initial position relative to the vehicle wheels, and at least one vehicle body position actuator connected between the vehicle wheels and the vehicle body, the method comprising:
- sensing a vehicle security breach; and
- operating the at least one vehicle body position actuator to reposition the vehicle body relative to the vehicle wheels and responsive to sensing the vehicle security breach.

34. The method according to claim 33 wherein the vehicle also includes vehicle headlights carried by the body; and further comprising operating the vehicle headlights responsive to sensing the vehicle security breach.

35. The method according to claim 33 wherein the at least one vehicle body position actuator comprises a respective vehicle body position actuator for each vehicle wheel; and wherein operating the vehicle body position actuators comprises operating the vehicle body position actuators in a predetermined pattern to reposition the vehicle body relative to the vehicle wheels in a rocking motion.

36. The method according to claim 33 wherein the vehicle further comprises a vehicle data communications bus extending through the vehicle body; and wherein operating the at least one vehicle body position actuator comprises operating the at least one vehicle body position actuator via the vehicle data communications bus.

37. The method according to claim 36 wherein operating the at least one vehicle body position actuator comprises operating the at least one vehicle body position actuator using a vehicle security controller further enabled to use a desired set of data bus codes for the vehicle from among a plurality of sets of data bus codes for different vehicles.

38. The method according to claim 33 further comprising generating an audible alarm indication responsive to sensing the vehicle security breach.

39. The method according to claim 33 wherein sensing comprises sensing using at least one of a door position switch, a hood position switch, a trunk position switch, and a motion sensor.

* * * * *

UNITED STATES PATENT AND TRADEMARK OFFICE
CERTIFICATE OF CORRECTION

PATENT NO. : 7,378,945 B2
APPLICATION NO. : 10/855016
DATED : May 27, 2008
INVENTOR(S) : Kenneth E. Flick It is certified that error appears in the above-identified patent and that said Letters Patent is hereby corrected as shown below:

| | |
|---|---|
| Abstract (57), Line 12 | Delete: "that also"<br>Insert: --that are also-- |
| Column 1, Line 59 | Delete: "vehicle"<br>Insert: --vehicles-- |
| Column 2, Line 36 | Delete: "that also"<br>Insert: --that are also-- |
| Column 3, Line 39 | Delete: "is schematic"<br>Insert: --is a schematic-- |
| Column 3, Line 41 | Delete: "is schematic"<br>Insert: --is a schematic-- |
| Column 3, Line 45 | Delete: "is schematic"<br>Insert: --is a schematic-- |
| Column 3, Line 48 | Delete: "is schematic"<br>Insert: --is a schematic-- |
| Column 4, Line 48 | Delete: "responsive the"<br>Insert: --responsive to the-- |
| Column 4, Line 48-49 | Delete: "connected"<br>Insert: --connect-- |
| Column 6, Line 1 | Delete: "30$a$030$d$"<br>Insert: --30$a$, 30$d$-- |

UNITED STATES PATENT AND TRADEMARK OFFICE
CERTIFICATE OF CORRECTION

PATENT NO. : 7,378,945 B2
APPLICATION NO. : 10/855016
DATED : May 27, 2008
INVENTOR(S) : Kenneth E. Flick It is certified that error appears in the above-identified patent and that said Letters Patent is hereby corrected as shown below:

Column 6, Line 13     Delete: "that also"
                      Insert: --that are also--

Column 6, Line 21     Delete: "may typical"
                      Insert: --may be typical--

Signed and Sealed this

Thirtieth Day of September, 2008

JON W. DUDAS
*Director of the United States Patent and Trademark Office*